United States Patent
Zhang

(10) Patent No.: US 11,801,557 B2
(45) Date of Patent: Oct. 31, 2023

(54) LAMINATE MOLDING METHOD AND LAMINATE MOLDING APPARATUS

(71) Applicant: TOYOTA JIDOSHA KABUSHIKI KAISHA, Toyota (JP)

(72) Inventor: Shuai Zhang, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 63 days.

(21) Appl. No.: 17/238,616

(22) Filed: Apr. 23, 2021

(65) Prior Publication Data

US 2021/0394270 A1 Dec. 23, 2021

(30) Foreign Application Priority Data

Jun. 18, 2020 (JP) ................................. 2020-104993

(51) Int. Cl.
*B22F 10/20* (2021.01)
*B33Y 30/00* (2015.01)
(Continued)

(52) U.S. Cl.
CPC ............ *B22F 10/20* (2021.01); *B22F 12/226* (2021.01); *B22F 12/41* (2021.01); *B33Y 30/00* (2014.12);
(Continued)

(58) Field of Classification Search
CPC ........ B22F 10/20; B22F 12/226; B22F 12/41; B22F 2202/06; B22F 2999/00;
(Continued)

(56) References Cited

U.S. PATENT DOCUMENTS

2006/0108712 A1 5/2006 Mattes
2010/0044547 A1* 2/2010 Higashi .................. B22F 3/003
425/78

(Continued)

FOREIGN PATENT DOCUMENTS

JP 2005-534543 A 11/2005
JP 2010-228332 A 10/2010
(Continued)

OTHER PUBLICATIONS

Machine translation of Higashi Kei, et.al. [WO2019088105A1] (Year: 2019).*

*Primary Examiner* — Brian D Walck
*Assistant Examiner* — Nazmun Nahar Shams
(74) *Attorney, Agent, or Firm* — Oblon, McClelland, Maier & Neustadt, L.L.P.

(57) ABSTRACT

Provided is a laminate molding method for additionally manufacturing a molded object on a table by use of metal powder. The laminate molding method includes: a metal powder layer forming step of forming a metal powder layer by supplying metal powder onto a table; a melting step of melting the metal powder layer by applying, to the metal powder layer, electromagnetic energy emitted from an electromagnetic energy source; a rotating step of rotating the electromagnetic energy source and the table relative to each other; and a table vertically moving step of vertically moving the table relative to the electromagnetic energy source. Gas is emitted from a gas emission port toward an outer side of the table, the gas emission portion being provided in generally a center of the table.

5 Claims, 13 Drawing Sheets

(51) Int. Cl.
    *B33Y 70/00*          (2020.01)
    *B22F 12/41*          (2021.01)
    *B22F 12/00*          (2021.01)
    *B33Y 10/00*          (2015.01)

(52) U.S. Cl.
    CPC ........... *B33Y 70/00* (2014.12); *B22F 2202/06* (2013.01); *B22F 2999/00* (2013.01); *B33Y 10/00* (2014.12)

(58) Field of Classification Search
    CPC ......... B33Y 30/00; B33Y 70/00; B33Y 10/00; B29C 64/371; B29C 64/364; B29C 64/245
    See application file for complete search history.

(56) References Cited

U.S. PATENT DOCUMENTS

2015/0174823 A1*   6/2015   Wiesner .................. B22F 12/50
                                                                                  264/497
2018/0085995 A1*   3/2018   Davis ..................... B33Y 50/02

FOREIGN PATENT DOCUMENTS

| JP | 2015-78434 A | 4/2015 | |
|---|---|---|---|
| JP | 2016-508086 A | 3/2016 | |
| JP | 2018-507957 A | 3/2018 | |
| WO | WO-2019088105 A1 * | 5/2019 | ............ B05B 1/005 |
| WO | 2020/004507 A1 | 1/2020 | |

\* cited by examiner

FIG. 4
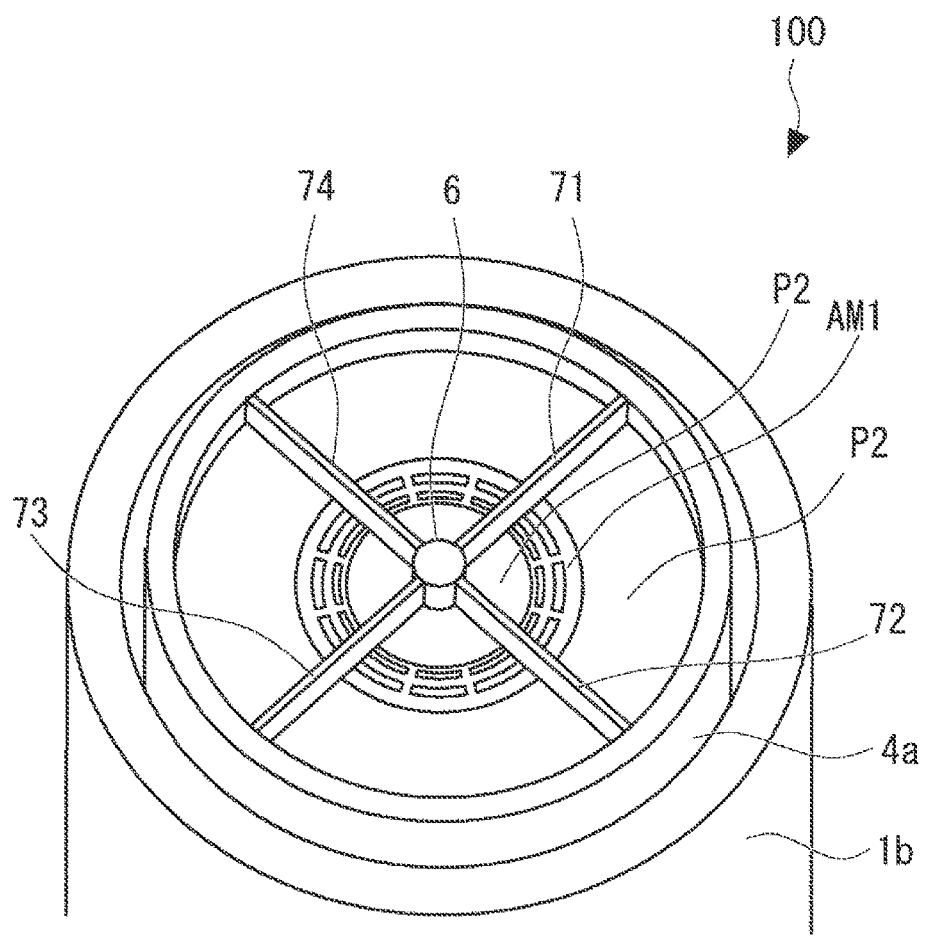
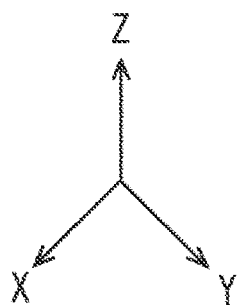

FIG. 11
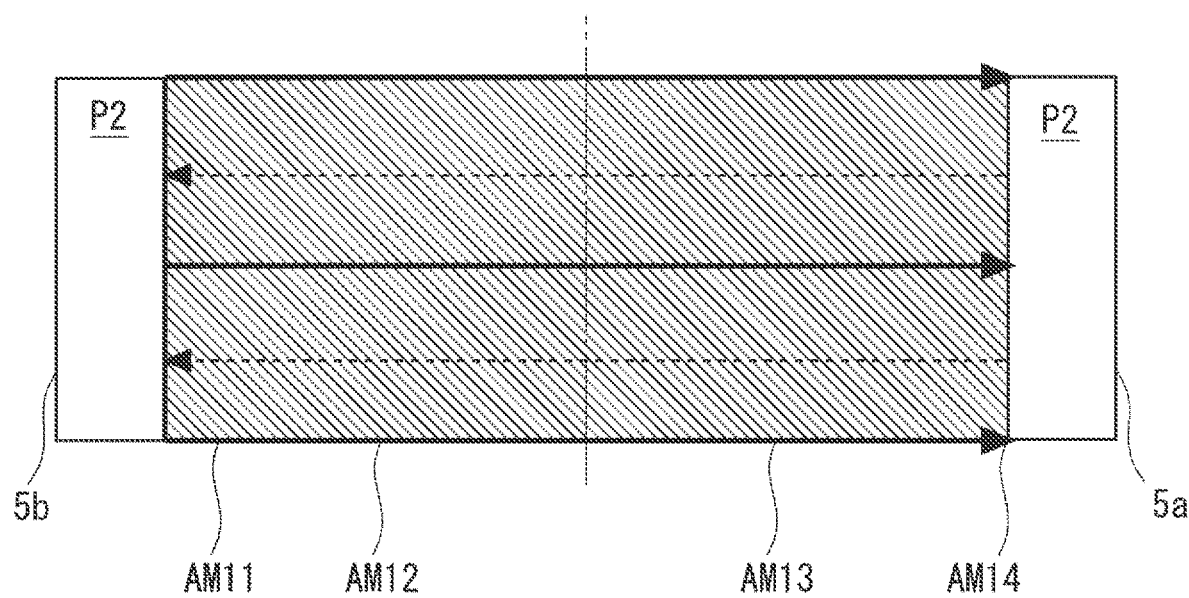

LAMINATE MOLDING METHOD AND LAMINATE MOLDING APPARATUS

CROSS-REFERENCE TO RELATED APPLICATION

This application claims priority to Japanese Patent Application No. 2020-104993 filed on Jun. 18, 2020, incorporated herein by reference in its entirety.

BACKGROUND

1. Technical Field

The present disclosure relates to a laminate molding method and a laminate molding apparatus and particularly relates to a laminate molding method and a laminate molding apparatus each for manufacturing a molded object by use of powder.

2. Description of Related Art

One example of such a laminate molding apparatus is described in Japanese Unexamined Patent Application Publication (Translation of PCT Application) No. 2005-534543 (JP 2005-534543 A). In the laminate molding apparatus, a formation region in which a molded object is to be formed is displaced rotatably relative to a material application device configured to form a layer of a structural material by application, and a solidification device. Hereby, the material application device and the solidification device can be used at the same time at different points in the formation region. That is, productivity at the time of manufacturing an object improves by performing application and solidification of the material at the same time.

SUMMARY

The inventors of the present disclosure found the following problems.

In such a laminate molding apparatus, fumes are generated when the material is solidified. In many cases, gas is introduced to remove the fumes. However, the fumes might remain and adversely affect the quality of a molded object. On that account, the inventors of the present disclosure conceived that the remains of the fumes were restrained by increasing the flow rate of the gas. However, when the flow rate of the gas is increased, particles with small diameters are carried away while particles with large diameters remain. This causes such a problem that a minute structure cannot be formed in a molded object.

More specifically, as illustrated in FIG. 12, a laminate molding apparatus 900 is configured such that an inlet 96 and an outlet 97 for a gas GF91 are provided on a first end 95$d$ side and a second end 95$e$ side of a table 95. A metal powder layer 92 is formed on a main surface of the table 95. In the laminate molding apparatus 900, a laser beam L9 is applied to the metal powder layer 92, and the gas GF91 is introduced from the inlet 96 to the outlet 97. The application of the laser beam L9 to the metal powder layer 92 generates a fume F9.

In a case where the flow amount of the gas GF91 is not sufficient, the fume F9 might remain and adversely affect the quality of a molded object. In the meantime, in a case where the flow amount of the gas GF91 is sufficient, the fume F9 flows to the outlet 97 by the gas GF91. However, the speed of the gas GF91 is high in vicinity of the inlet 96 but is low in the vicinity of the outlet 97. On this account, on the first end 95$d$ side of the metal powder layer 92, particles with small diameters are carried away while particles with large diameters remain. On this account, on the first end 95$d$ side of the metal powder layer 92, the structure of the molded object tends to be rough.

The present disclosure can restrain fumes from adversely affecting a molded object.

A laminate molding method according to the present disclosure is a laminate molding method for additionally manufacturing a molded object on a table by use of metal powder. The laminate molding method includes: a metal powder layer forming step of forming a metal powder layer by supplying the metal powder onto the table; a melting step of melting the metal powder layer by applying, to the metal powder layer, electromagnetic energy emitted from an electromagnetic energy source; a rotating step of rotating the electromagnetic energy source and the table relative to each other; and a table vertically moving step of vertically moving the table relative to the electromagnetic energy source. Gas is emitted from a gas emission port toward an outer side of the table, the gas emission portion being provided in generally a center of the table.

In such a configuration, gas is emitted toward the outer side of the table from generally the center of the table on which a molded object is to be formed. Accordingly, the moving distance of the gas is shortened, so that the speed of the gas is maintained. On this account, the gas discharges fumes to outside the table, so that the fumes can be removed appropriately. This accordingly makes it possible to restrain the fumes from adversely affecting the molded object.

Further, in the melting step, the electromagnetic energy emitted from the electromagnetic energy source may be applied to the metal powder layer so that an irradiated part of the metal powder layer moves from the outer side of the table toward a center side of the table, the irradiated part being irradiated with the electromagnetic energy.

In such a configuration, the irradiated part moves in a direction distanced from fumes continuously generated hour by hour. On this account, the fumes do not block irradiation with electromagnetic energy. This accordingly makes it possible to restrain the fumes from adversely affecting the molded object.

Further, the metal powder layer forming step and the melting step may be performed at the same time.

With such a configuration, after a metal powder layer is formed, the metal powder layer can be melted immediately, and further, the formation and the melting can be performed successively. Accordingly, it is possible to increase the molding speed of the molded object.

The metal powder layer forming step and the table vertically moving step may be performed at the same time.

In such a configuration, after a metal powder layer is formed, the metal powder layer is melted immediately. Further, a space where a next metal powder layer is formable can be generated on the metal powder layer thus formed. Accordingly, it is possible to further increase the molding speed of the molded object.

The metal powder layer forming step, the melting step, and the table vertically moving step may be performed at the same time.

With such a configuration, the formation of a metal powder layer, the melting of the metal powder layer, and the generation of a space where a next metal powder layer is formable can be performed successively. Accordingly, it is possible to further increase the molding speed of the molded object.

A laminate molding apparatus according to the present disclosure is a laminate molding apparatus for additionally manufacturing a molded object on a table by use of metal powder. The laminate molding apparatus includes: an electromagnetic energy source; a drive source; and a gas supply portion provided in generally a center of the table. The electromagnetic energy source is configured to apply electromagnetic energy to a metal powder layer such that the metal powder layer is melted, the metal powder layer being formed by supplying the metal powder onto the table. The table and the electromagnetic energy source are provided rotatably relative to each other. The drive source is configured to vertically move the table relative to the electromagnetic energy source. The gas supply portion includes a gas emission port via which gas is emitted toward an outer side of the table.

In such a configuration, gas is emitted toward the outer side of the table from generally the center of the table on which a molded object is to be formed. Accordingly, the moving distance of the gas is shortened, so that the speed of the gas is maintained. On this account, the gas discharges fumes to outside the table, so that the fumes can be removed appropriately. This accordingly makes it possible to restrain the fumes from adversely affecting the molded object.

Further, the electromagnetic energy source may apply the electromagnetic energy to the metal powder layer so that an irradiated part of the metal powder layer moves from the outer side of the table toward a center side of the table, the irradiated part being irradiated with the electromagnetic energy.

In such a configuration, the irradiated part moves in a direction distanced from fumes continuously generated hour by hour. On this account, the fumes do not block irradiation with electromagnetic energy. This accordingly makes it possible to restrain the fumes from adversely affecting the molded object.

The laminate molding apparatus may further includes a squeegee. The squeegee may be configured to form the metal powder layer by supplying the metal powder onto the table. The electromagnetic energy source may be configured to apply the electromagnetic energy to the metal powder layer so that the metal powder layer is melted.

With such a configuration, after a metal powder layer is formed, the metal powder layer can be melted immediately, and further, the formation and the melting can be performed successively. Accordingly, it is possible to increase the molding speed of the molded object.

The laminate molding apparatus may further include a squeegee. The squeegee may be configured to form the metal powder layer by supplying the metal powder onto the table. The drive source may be configured to vertically move the table relative to the squeegee and the electromagnetic energy source.

With such a configuration, after the metal powder layer is formed, a space where a next metal powder layer is formable can be generated immediately on the metal powder layer thus formed. Accordingly, it is possible to further increase the molding speed of the molded object.

The laminate molding apparatus may further include a squeegee. The squeegee may be configured to form the metal powder layer by supplying the metal powder onto the table. The electromagnetic energy source may be configured to apply the electromagnetic energy to the metal powder layer so that the metal powder layer is melted. The drive source may be configured to vertically move the table relative to the squeegee and the electromagnetic energy source.

With such a configuration, after the metal powder layer is formed, a space where a next metal powder layer is formable can be generated immediately on the metal powder layer thus formed. Accordingly, it is possible to further increase the molding speed of the molded object.

The present disclosure can restrain fumes from adversely affecting a molded object.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a perspective view illustrating an essential part of one concrete example of the laminate molding apparatus according to Embodiment 1;

FIG. 11 is a top view illustrating another operation of one example of the laminate molding apparatus according to Embodiment 1;

DETAILED DESCRIPTION OF EMBODIMENTS

Concrete embodiments to which the present disclosure is applied will be described in detail with reference to the drawings. However, the present disclosure is not limited to the following embodiments. Further, the following description and drawings are simplified appropriately for clarification of the description.

Embodiment 1

Figure 1:
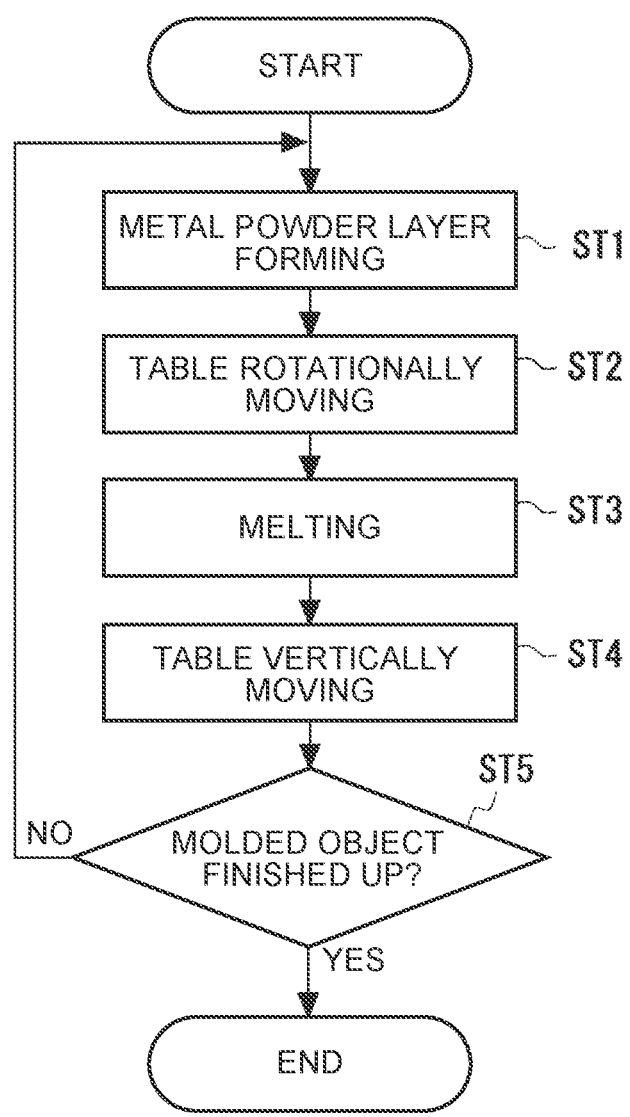
FIG. 1 is a flowchart illustrating a laminate molding method according to Embodiment 1.

With reference to FIG. 1, a laminate molding method according to Embodiment 1 will be described. FIG. 1 is a flowchart illustrating a laminate molding method according to Embodiment 1.

Metal powder is supplied onto a table, so that a metal powder layer is formed (metal powder layer forming step ST1). The metal powder can be supplied onto the table by use of a squeegee, a net, and the like, for example.

Subsequently, an electromagnetic energy source and the table are rotated relative to each other (table rotationally moving step ST2). More specifically, due to this rotation, the metal powder layer moves from a first region on a main surface of the table on which the metal powder layer is formed in the metal powder layer forming step ST1 to a second region on the main surface of the table below the laser head.

Subsequently, electromagnetic energy emitted from the electromagnetic energy source is applied to the metal powder layer, so that the metal powder layer is melted (melting step ST3). Note that, in melting step ST3, gas is emitted toward the outer side of the table from generally the center of the table. When the metal powder layer melts and solidifies, part of a molded object is formed.

Subsequently, the table is vertically moved relative to the laser head (table vertically moving step ST4). More specifically, the table is vertically moved so that the table is separated from the laser head. The distance by which the table has moved should be the same as the thickness of the part of the molded object that is formed in melting step ST3. In other words, the table should be vertically moved so that a space where another metal powder layer is formable is generated on the table.

Note that at least one of table rotationally moving step ST2, melting step ST3, and table vertically moving step ST4 may be performed at the same time as metal powder layer forming step ST1. More specifically, at least one of table rotationally moving step ST2, melting step ST3, and table vertically moving step ST4 may be started generally at the same time as the start timing of metal powder layer forming step ST1. The at at least one of table rotationally moving step ST2, melting step ST3, and table vertically moving step ST4 may end generally at the same time as the end timing of metal powder layer forming step ST1. The steps can be performed successively, so that the molding speed of the molded object is increased.

Subsequently, it is determined whether the molded object is finished up or not (finish determination step ST5). When it is determined that the molded object is not finished up (finish determination step ST5: NO), the process returns to metal powder layer forming step ST1. That is, the process from metal powder layer forming step ST1 to table vertically moving step ST4 is performed repeatedly until it is determined that the molded object is finished up.

Hereby, the molded object can be manufactured. In such a configuration, gas is emitted toward the outer side of the table from generally the center side of the table on which the molded object is to be formed. Hereby, the moving distance of the gas is shortened, so that the speed of the gas is maintained. On this account, the gas discharges fumes to outside the table, so that the fumes can be removed from the table appropriately. This accordingly makes it possible to restrain the fumes from adversely affecting the molded object.

Laminate Molding Apparatus

Figure 2:
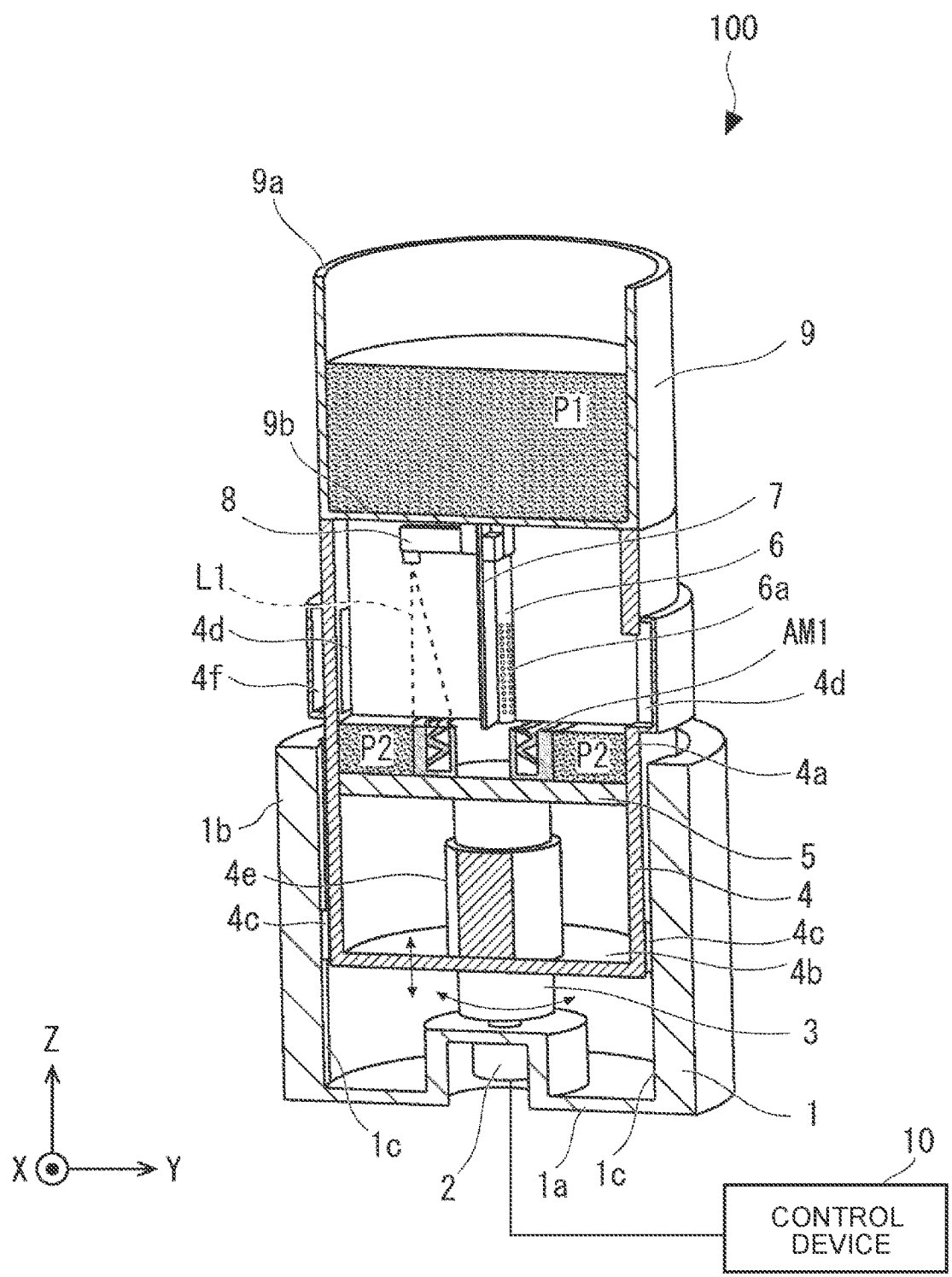
FIG. 2 is a sectional view of one example of a laminate molding apparatus according to Embodiment 1.
Figure 3:
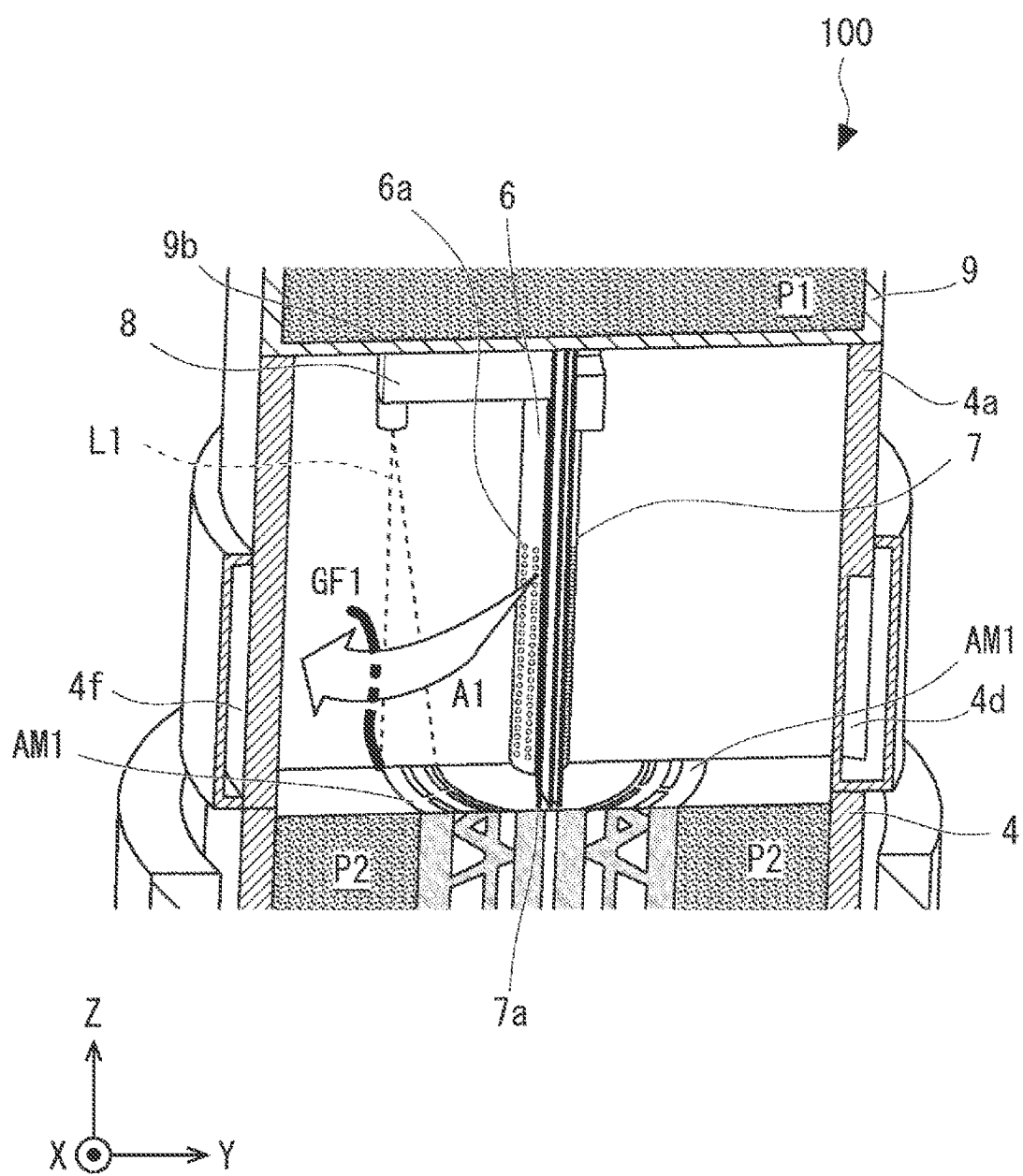
FIG. 3 is an enlarged sectional view of the one example of the laminate molding apparatus according to Embodiment 1.

Next will be described one concrete example of a laminate molding apparatus that can be used in the laminate molding method according to Embodiment 1, with reference to FIG. 2. FIG. 2 is a sectional view of one concrete example of the laminate molding apparatus. FIG. 3 is an enlarged sectional view of the one concrete example of the laminate molding apparatus illustrated in FIG. 2.

Naturally, the XYZ right handed coordinate systems in FIG. 2 and other figures are illustrated for convenience of description of a positional relationship between constituents. Generally, a Z-axis positive side indicates a vertically upper side, and an XY plane is a horizontal plane. This is common between the figures.

As illustrated in FIGS. 2, 3, the laminate molding apparatus 100 includes a base 1, a motor 2, a screw guide 3, an outer periphery cover 4, a table 5, a gas supply portion 6, a squeegee 7, a laser head 8, a tank 9, and a control device 10.

The base 1 includes a bottom portion 1a and a side wall portion 1b. The bottom portion 1a holds the motor 2. The side wall portion 1b extends from a position distanced from the motor 2 on the bottom portion 1a. The side wall portion 1b according to the present embodiment is a cylindrical body. The side wall portion 1b has a groove 1c extending in a direction distanced from the bottom portion 1a.

The motor 2 receives electric power from a power source (not shown). The screw guide 3 is provided rotatably inside the side wall portion 1b of the base 1. The screw guide 3 has a male screw portion. The screw pitch of the male screw portion of the screw guide 3 should be generally the same as a product of the average particle diameter of metal powder P1 and the number N of the squeegee 7, for example. The motor 2 gives a driving force to the screw guide 3 by use of the electric power and rotates the screw guide 3 around its axis. The motor 2 gives the driving force to the screw guide 3 based on a control signal acquired from the control device 10.

The outer periphery cover 4 includes a main body 4a and a bottom portion 4b. The main body 4a is a cylindrical body. The cylindrical body should have the same axis as the axis of the screw guide 3. The bottom portion 4b closes a bottom end of the main body 4a. An upper end of the main body 4a is opened. A slide guide 4c is provided on an outer peripheral surface of the main body 4a. The slide guide 4c is inserted slidably in the groove 1c. The outer periphery cover 4 is provided inside the side wall portion 1b of the base 1 via the slide guide 4c and is movable along the groove 1c. A gas discharge hole 4d is provided on an inner peripheral surface of the main body 4a. The bottom portion 4b includes a female screw portion 4e threadedly engaged with the male screw portion of the screw guide 3.

The table 5 is provided inside the outer periphery cover 4 and is supported rotatably by a second end of the screw guide 3. The table 5 can hold a metal powder layer P2. Further, the table 5 can hold a molded object AM1 and a remaining part of the metal powder layer P2, the molded object AM1 being formed such that a part of the metal powder layer P2 melts and solidifies. The table 5 is provided rotatably relative to the outer periphery cover 4. The table 5 and the main body 4a should make close contact with each other so that the metal powder layer P2 does not enter between the table 5 and the main body 4a.

The gas supply portion 6 is a tubular body having a gas emission port 6a. The gas supply portion 6 is provided inside the main body 4a, more specifically, above generally the center of the table 5 (herein, on a Z-axis positive side). The gas supply portion 6 according to Embodiment 1 extends on the same axis as the axis of the screw guide 3. The gas supply portion 6 receives gas from a gas source (not shown).

The gas supply portion 6 supplies the gas thus supplied onto the table 5 via the gas emission port 6a. More specifically, as illustrated in FIG. 3, a gas GF1 is emitted from the gas emission port 6a such that the gas GF1 flows from generally the center of the table 5 toward the outer side of the table 5. The gas GF1 should be a gas that can remove a fume generated from the metal powder layer P2, and the gas GF1 is, for example, air or inert gas. The gas that has reached the outer side of the table 5 is discharged to outside the outer periphery cover 4 through the gas discharge hole 4d. The gas supply portion 6 should change the flow amount of the gas GF1 and the supply stop timing of the gas GF1 based on control signals from the control device 10.

Note that the gas discharge hole 4d should be opened above the table 5 on the inner peripheral surface of the main body 4a of the outer periphery cover 4. Further, it is preferable that the gas discharge hole 4d face the gas emission port 6a of the gas supply portion 6. Further, the gas discharge hole 4d is connected to a gas passage 4f such that gas can flow therethrough. The gas passage 4f goes around the outer peripheral surface of the main body 4a of the outer periphery cover 4 from the gas discharge hole 4d and is connected to an opening (not shown) to outside the outer periphery cover 4.

The squeegee 7 is a plate-shaped body extending from the gas supply portion 6 to the outer side of the table 5. The laminate molding apparatus 100 may include a plurality of squeegees 7. The squeegee 7 extends toward the outer side of the table 5 from generally the center of the table 5 when the squeegee 7 is viewed from above. The squeegee 7 is provided rotatably around the gas supply portion 6. The squeegee 7 includes a hollow region so that the metal powder P1 can flow therethrough. The squeegee 7 is connected to a tank 9 via a pipe (not shown) and so on where the metal powder P1 can flow. The squeegee 7 receives the metal powder P1 from the tank 9. The metal powder P1 can be supplied from the tank 9 to the table 5 through the squeegee 7 such that the metal powder P1 falls by gravity, for example. The squeegee 7 includes an opening 7a and supplies the metal powder P1 onto the table 5 from the opening 7a. The metal powder P1 is supplied onto the table 5, so that the metal powder layer P2 is formed.

The laser head 8 is provided inside the outer periphery cover 4 and above the table 5. The laser head 8 should be adjacent to the squeegee 7. The laminate molding apparatus 100 may include a plurality of laser heads 8, and the number of laser heads 8 may be the same as the number of squeegees 7. The laser head 8 emits a laser beam L1 toward the metal powder layer P2. When the metal powder layer P2 is irradiated with the laser beam L1, the metal powder layer P2 melts and solidifies, so that the molded object AM1 is formed. Note that, instead of the laser head 8, an electromagnetic energy source may be provided. The electromagnetic energy source should emit electromagnetic energy by which the metal powder layer P2 can melt. The electromagnetic energy may be a laser beam or an electron beam, for example. The laser head 8 applies the laser beam L1 to each part of the metal powder layer P2 based on a control signal from the control device 10 so that the molded object AM1 having a predetermined shape is formed.

The metal powder P1 is stored in the tank 9. The metal powder P1 should be powder made of a metallic material that is usable in the laminate molding method. Such a metallic material is, for example, iron, aluminum, titanium, nickel, copper, or alloys of them. The tank 9 is, for example, a tubular body in which a first end 9a is closed while a second end 9b is opened. The metal powder P1 is supplied through the opening of the second end 9b. The tank 9 is connected to the squeegee 7 via a pipe (not shown) and so on where the metal powder P1 can flow.

The control device 10 sends control signals to respective constituents of the laminate molding apparatus 100 and controls the respective constituents of the laminate molding apparatus 100 based on the control signal. The respective constituents of the laminate molding apparatus 100 are, for example, the motor 2, the gas supply portion 6, and the laser head 8. The control device 10 can use a computer as a hardware configuration. The control device 10 should include, more specifically, a control device, a central processing unit, a storage medium in which various programs are stored, an interface via which a user can input or output, and so on. The control device reads various programs stored in the storage medium, and the central processing unit executes processes in accordance with the various programs.

Note that the programs stored in the storage medium provided in the control device 10 or the like can be stored by use of various types of non-transitory computer readable media and supplied to the computer. The non-transitory computer readable media include various types of tangible storage media. Examples of the non-transitory computer readable media include magnetic recording media (e.g., a flexible disk, a magnetic tape, a hard disk drive), optical magnetic recording media (e.g., a magneto-optical disk), a CD read-only memory (CD-ROM), a CD-R, a CD-R/W, and a semiconductor memory (e.g., a mask ROM, a programmable ROM (PROM)), an erasable PROM (EPROM), a flash ROM, and a random access memory (RAM)). Further, the programs can be supplied to the computer by various types of transitory computer readable media. Examples of the transitory computer readable media include an electrical signal, an optical signal, and an electromagnetic wave. The transitory computer readable media can supply the programs to the computer via a wired communication channel such as an electric wire or an optical fiber, or a wireless communication channel.

One Concrete Example of Laminate Molding Apparatus

Figure 5:
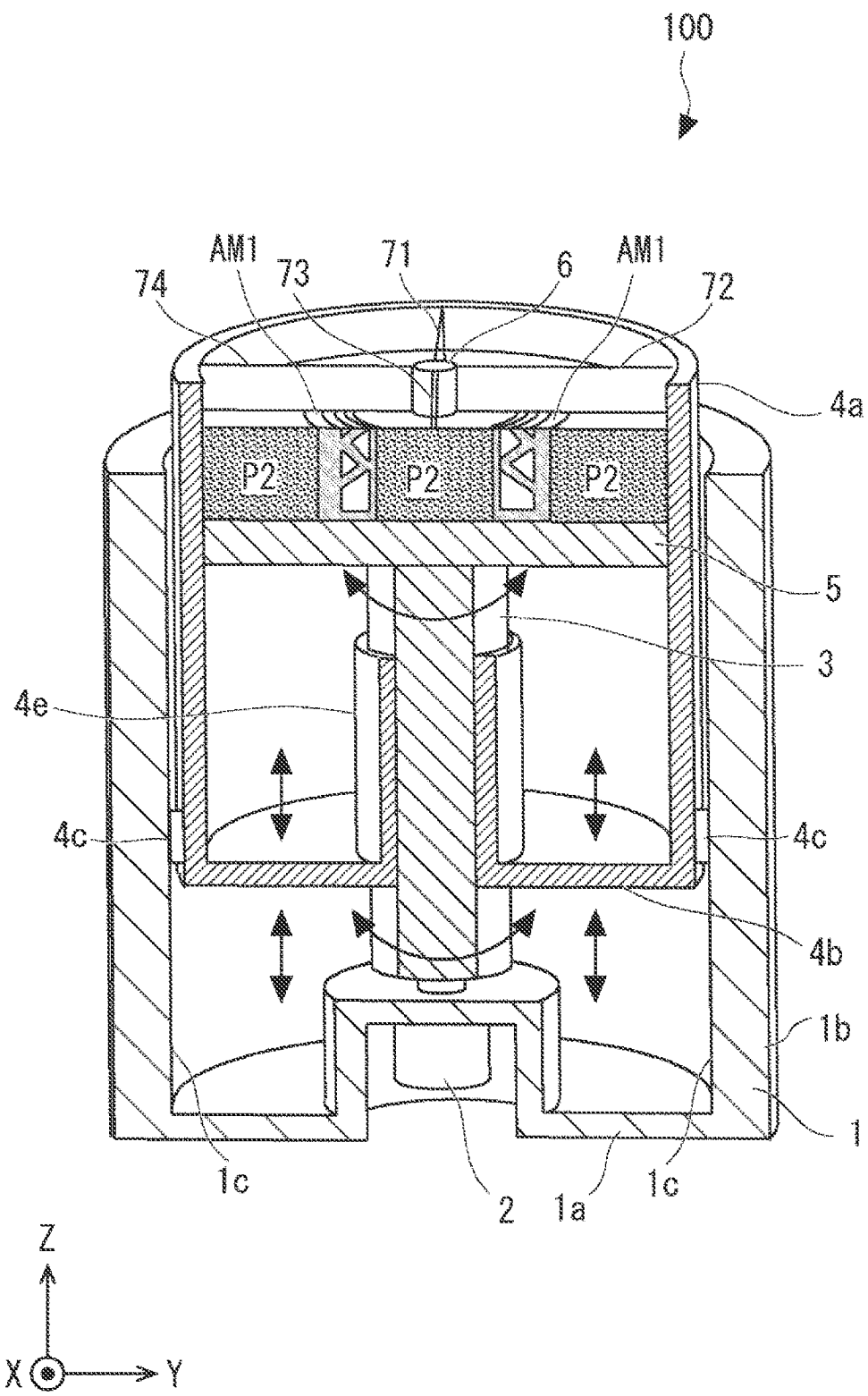
FIG. 5 is a longitudinal sectional view illustrating an operation of the one concrete example of the laminate molding apparatus according to Embodiment 1.
Figure 6:
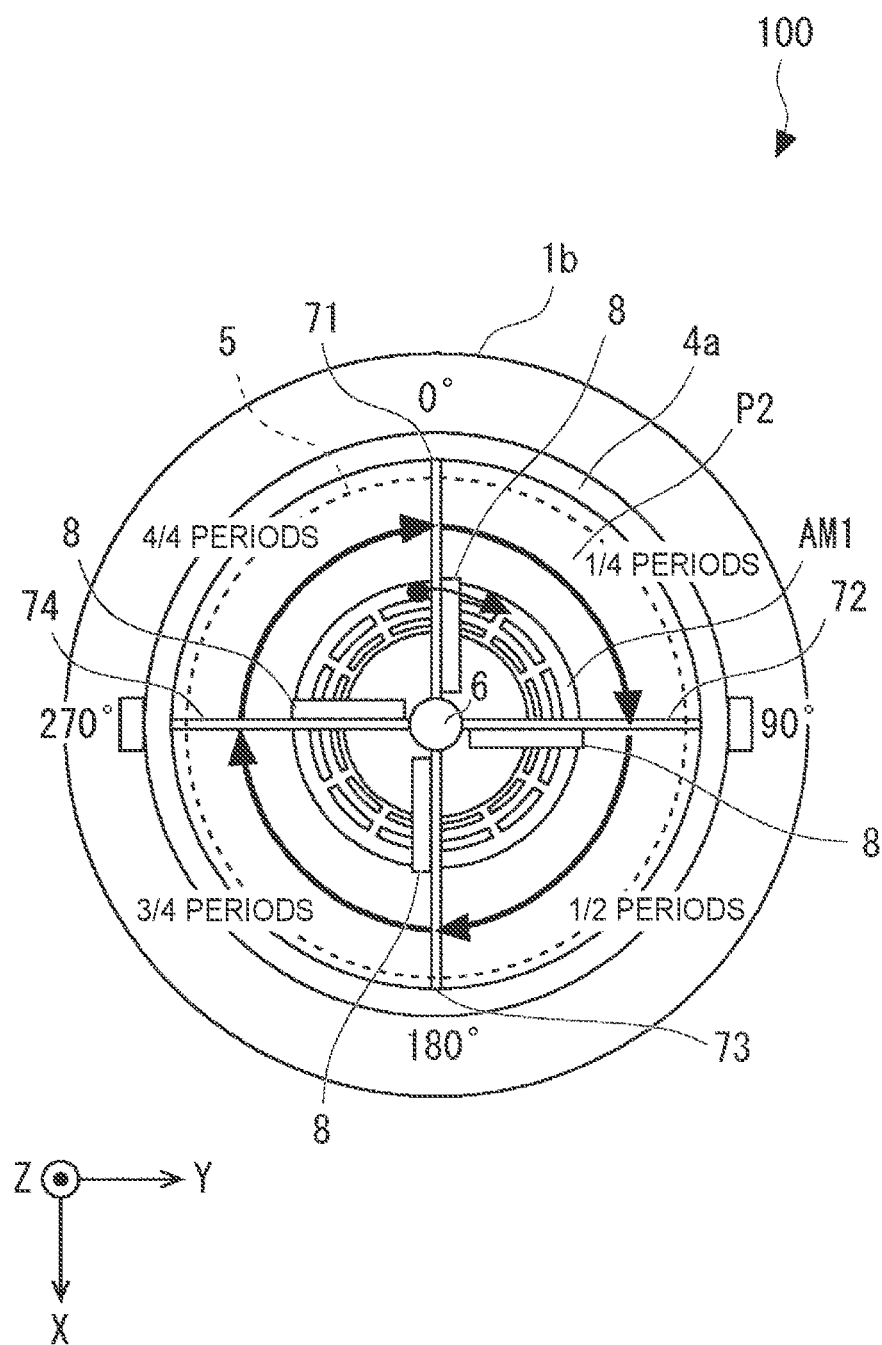
FIG. 6 is a cross-sectional view illustrating an operation of the one concrete example of the laminate molding apparatus according to Embodiment 1.
Figure 7:
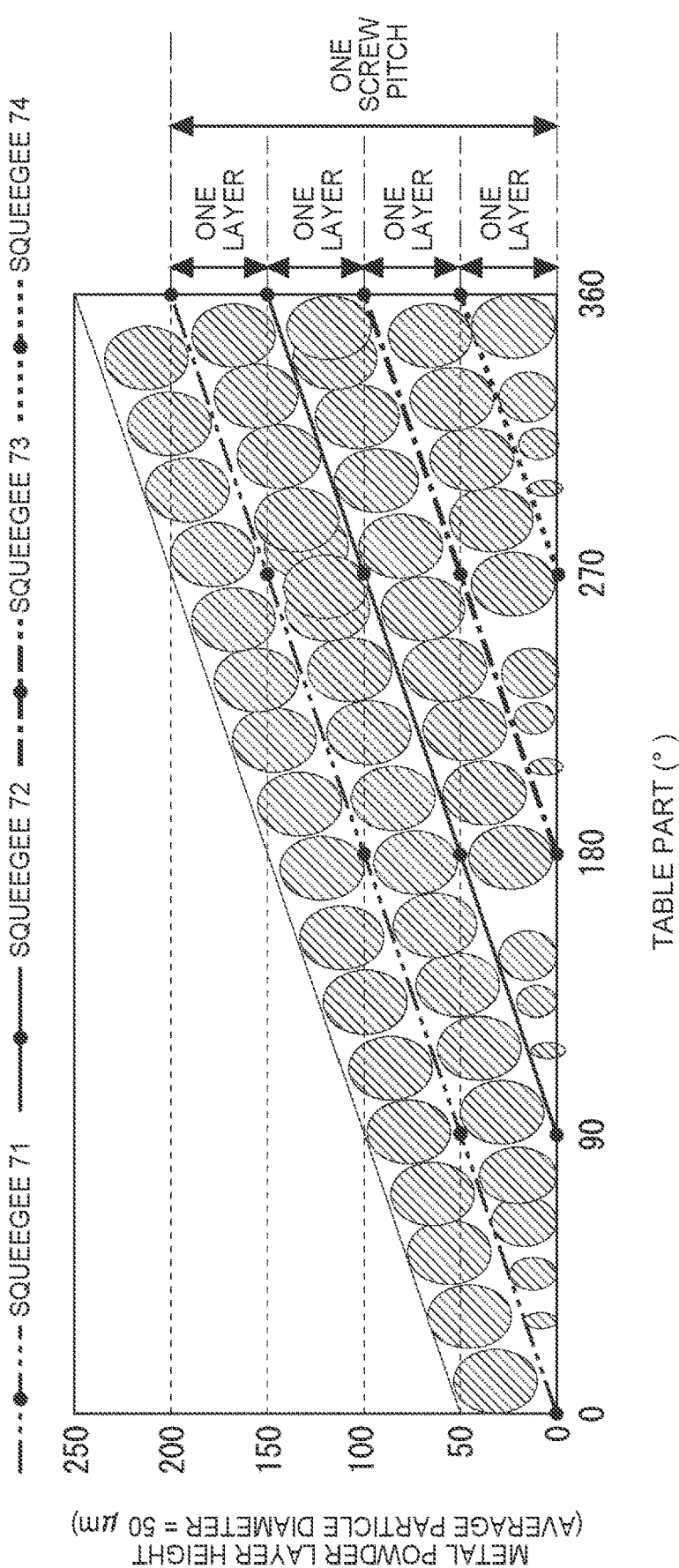
FIG. 7 is a graph illustrating one concrete example of the height of a metal powder layer relative to a table part.

Next will be described one concrete example of a laminate molding apparatus according to Embodiment 1 with reference to FIGS. 4 to 7. FIG. 4 is a perspective view illustrating an essential part of one concrete example of the laminate molding apparatus according to Embodiment 1. FIG. 5 is a longitudinal sectional view illustrating an operation of the one concrete example of the laminate molding apparatus illustrated in FIG. 4. FIG. 6 is a cross-sectional view illustrating an operation of the one concrete example of the laminate molding apparatus illustrated in FIGS. 4, 5. FIG. 7 is a graph illustrating one concrete example of the height of a metal powder layer relative to a table part. In FIGS. 4 to 6, hatching is omitted for easiness to understand. Further, in FIG. 6, the table 5 is illustrated to be smaller than the sizes of the table 5 illustrated in FIGS. 2, 5 for easiness to understand.

As illustrated in FIG. 4, the gas supply portion 6 according to Embodiment 1 is provided in generally the center inside the main body 4a. Further, the laminate molding apparatus 100 according to Embodiment 1 includes four squeegees 71, 72, 73, 74. The squeegees 71 to 74 extend in four directions from the gas supply portion 6, respectively. The squeegees 71 to 74 are perpendicular to each other. Note that the number N of squeegees 7 provided in the laminate molding apparatus 100 is not limited to four and may be one, two, three, or five or more. As the number N of squeegees 7 increases, the molding speed of the molded object AM1 increases. It is preferable that a space where the laser head 8 illustrated in FIG. 2 is placeable be formed between the squeegees 71 to 74.

As illustrated in FIG. 6, the laminate molding apparatus 100 according to Embodiment 1 includes four laser heads 8. When the four laser heads 8 are viewed from above, the four laser heads 8 and the squeegees 71 to 74 are placed alternately in the rotation direction (a direction clockwise on FIG. 6) of the table 5. More specifically, each of the four laser heads 8 is provided at a position adjacent to its corresponding one of the squeegees 71 to 74. A set of the squeegee 71 and the laser head 8 adjacent to each other should be arranged in order of the squeegee 71 and the laser head 8 in the rotation direction of the table 5. A set of the squeegee 72 and the laser head 8 adjacent to each other, a set of the squeegee 73 and the laser head 8 adjacent to each other, and a set of the squeegee 74 and the laser head 8 adjacent to each other should be also arranged in a similar manner to the set of the squeegee 71 and the laser head 8 adjacent to each other.

As described above, the female screw portion 4e of the outer periphery cover 4 is threadedly engaged with the male screw portion of the screw guide 3. The outer periphery cover 4 is provided inside the side wall portion 1b of the base 1 via the slide guide 4c and is movable along the groove 1c.

As illustrated in FIG. 5, the motor 2 gives a driving force to the screw guide 3 and rotates the screw guide 3 around its axis. Hereby, the female screw portion 4e receives a force along the axial direction (herein, the Z-axis direction) of the screw guide 3 and a force in a direction where the female screw portion 4e is to rotate around the axis of the screw guide 3. The slide guide 4c is restricted by the groove 1c, so that the outer periphery cover 4 hardly rotates. Meanwhile, the outer periphery cover 4 receives a force directed toward the axial direction of the screw guide 3 and moves. The outer periphery cover 4 can approach the bottom portion 1a of the base 1 and can separate from the bottom portion 1a.

Further, due to the rotation of the screw guide 3 around the axis, the table 5 rotates around the axis of the screw guide 3. Then, as illustrated in FIG. 6, the table 5 rotates relative to the squeegees 71 to 74 and the laser heads 8. As described above, the table 5 supports the metal powder layer P2 and the molded object AM1. Further, the gas supply portion 6 according to Embodiment 1 is provided on the same axis as the axis of the screw guide 3. On this account, along with the rotation of the table 5, the metal powder layer P2 and the molded object AM1 rotate around the gas supply portion 6.

Here, one concrete example of the metal powder layer P2 was manufactured by use of the one concrete example of the laminate molding method according to Embodiment 1 described above. In terms of the one concrete example of the metal powder layer P2, its metal powder layer height to the table 5 is illustrated in FIG. 7. Here, the average particle diameter of powder in the metal powder layer P2 was 50 μm. The average particle diameter can be found by a laser diffraction and scattering method. Note that particles illustrated in FIG. 7 are schematically illustrated, and the powder in the metal powder layer P2 has a predetermined particle size distribution. Further, the screw pitch of the male screw portion of the screw guide 3 should be generally the same as a product of the average particle diameter of the metal powder P1 and the number N of squeegees 7, for example.

As illustrated in FIG. 7, the squeegee 74 forms one layer from a table part of 270° to a table part of 360°. The squeegee 73 forms one layer from a table part of 180° to a table part of 360°. The squeegee 72 forms one layer formed from a table part of 90° to a table part of 360°. The squeegee 71 forms one layer formed from a table part of 0° to a table part of 360°. Hereby, four layers in total were formed by the squeegees 71 to 74. That is, the four layers thus formed correspond to one screw pitch of the screw guide 3. As the formation of the metal powder layer P2 further proceeds, another layer is formed on the one layer formed by the squeegee 74.

Exemplary Effects

Figure 8:
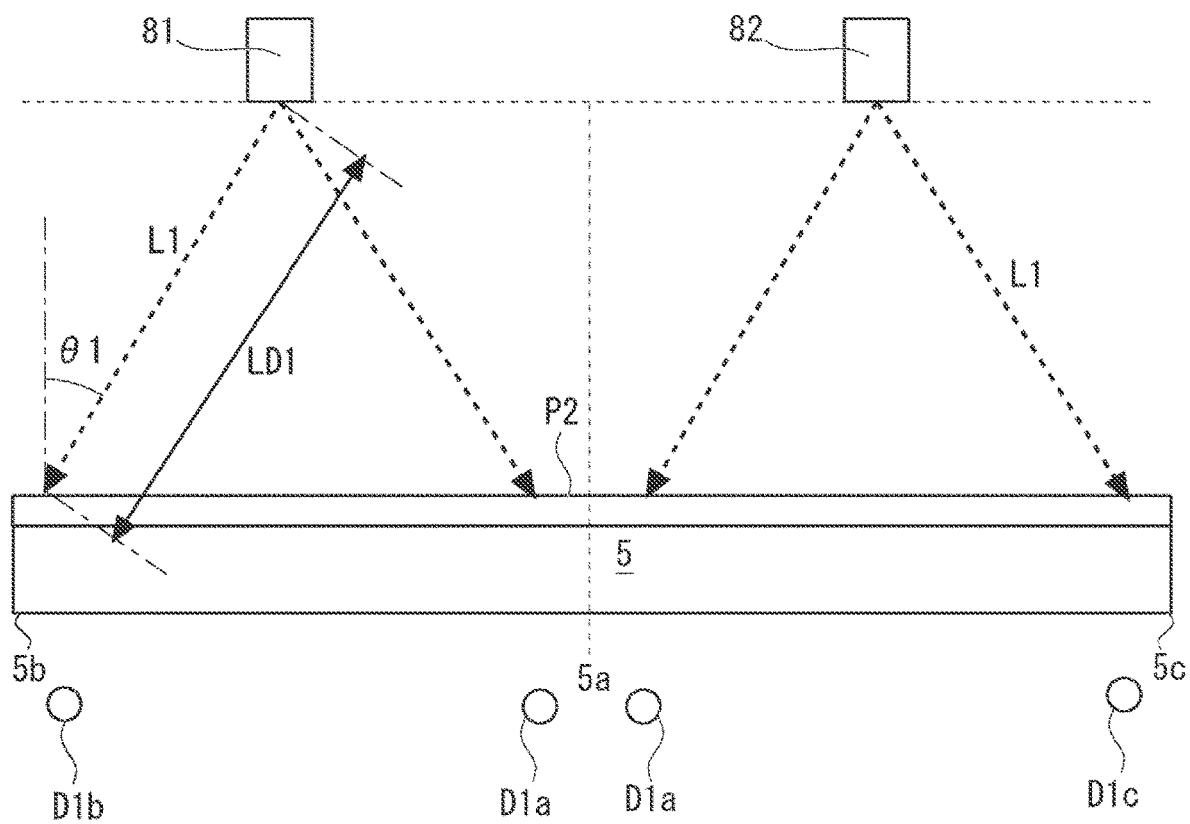
FIG. 8 is a schematic view of an essential part of one modification of the laminate molding apparatus according to Embodiment 1.
Figure 9:
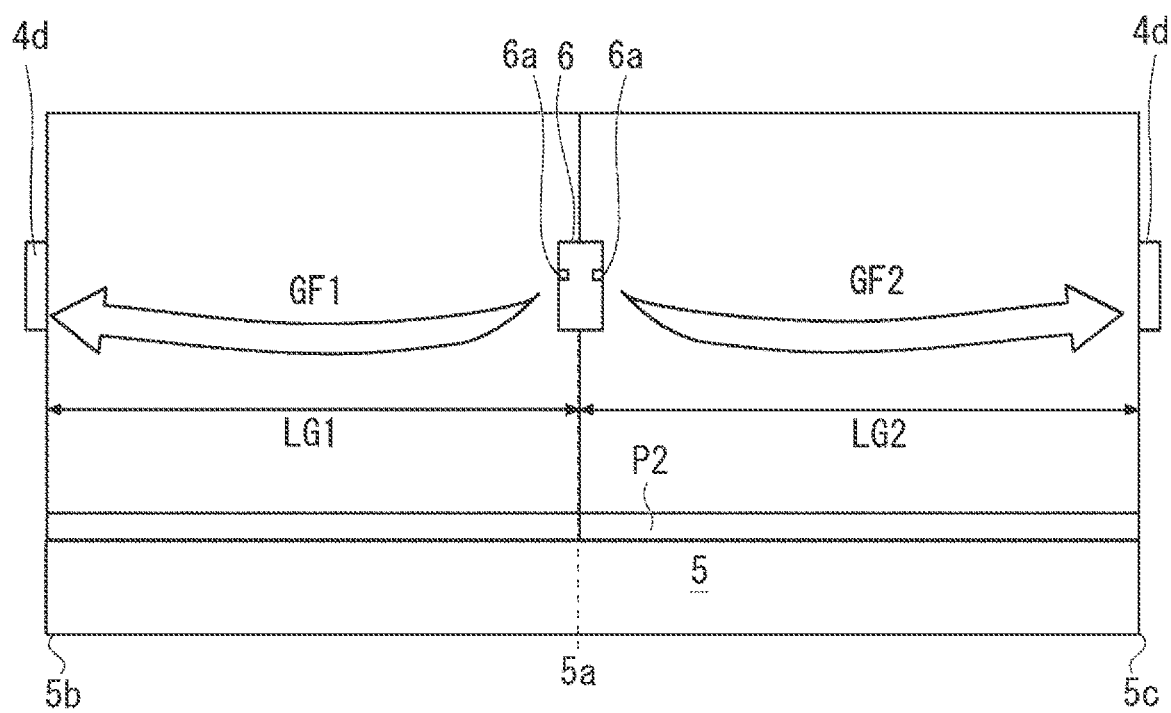
FIG. 9 is another schematic view of an essential part of one modification of the laminate molding apparatus according to Embodiment 1.
Figure 13:
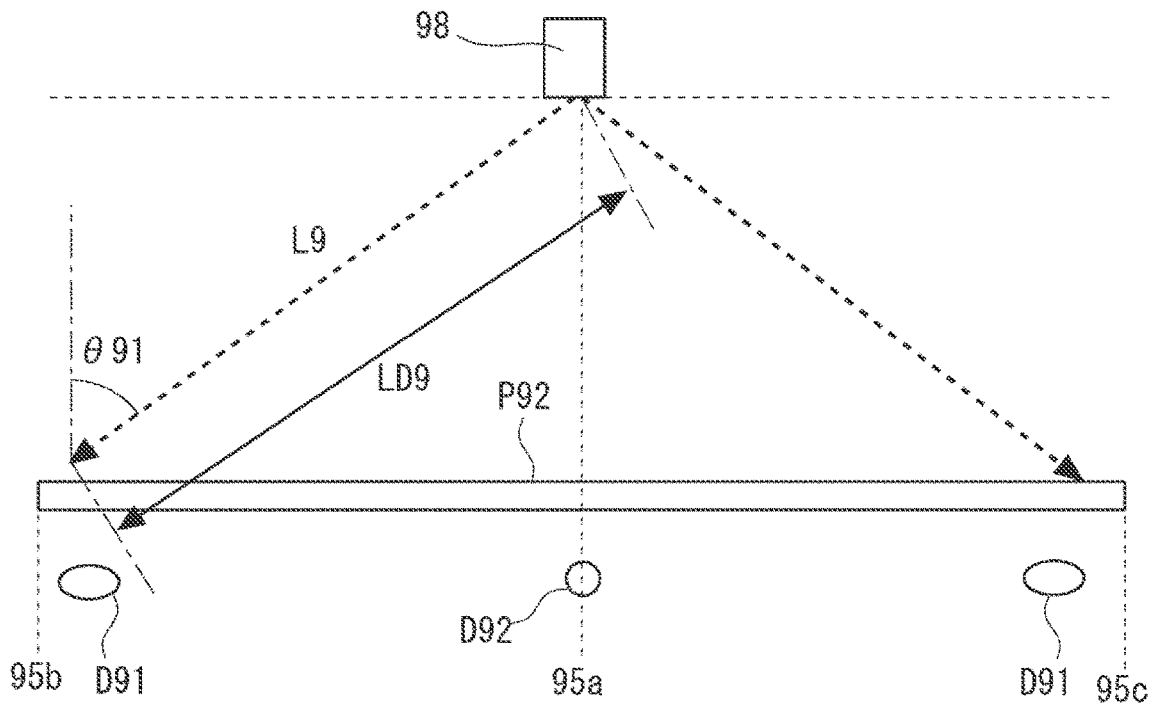
FIG. 13 is a schematic view illustrating an essential part of the laminate molding apparatus according to the problem to be solved by the present disclosure.
Figure 14:
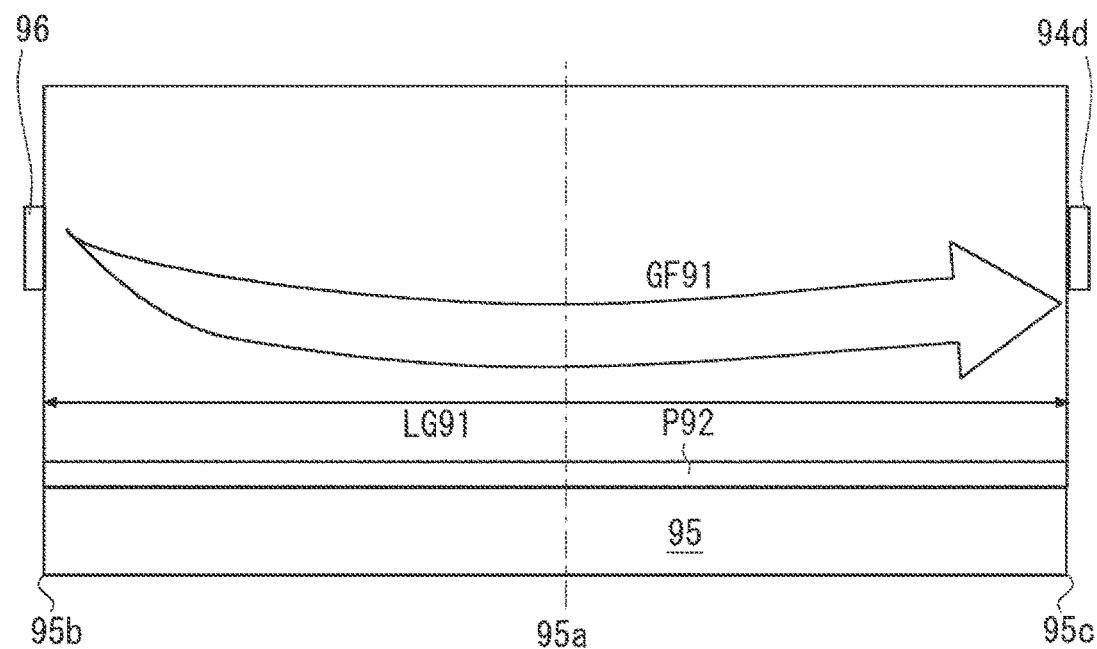
FIG. 14 is a schematic view illustrating another essential part of the laminate molding apparatus according to the problem to be solved by the present disclosure.
Figure 15:
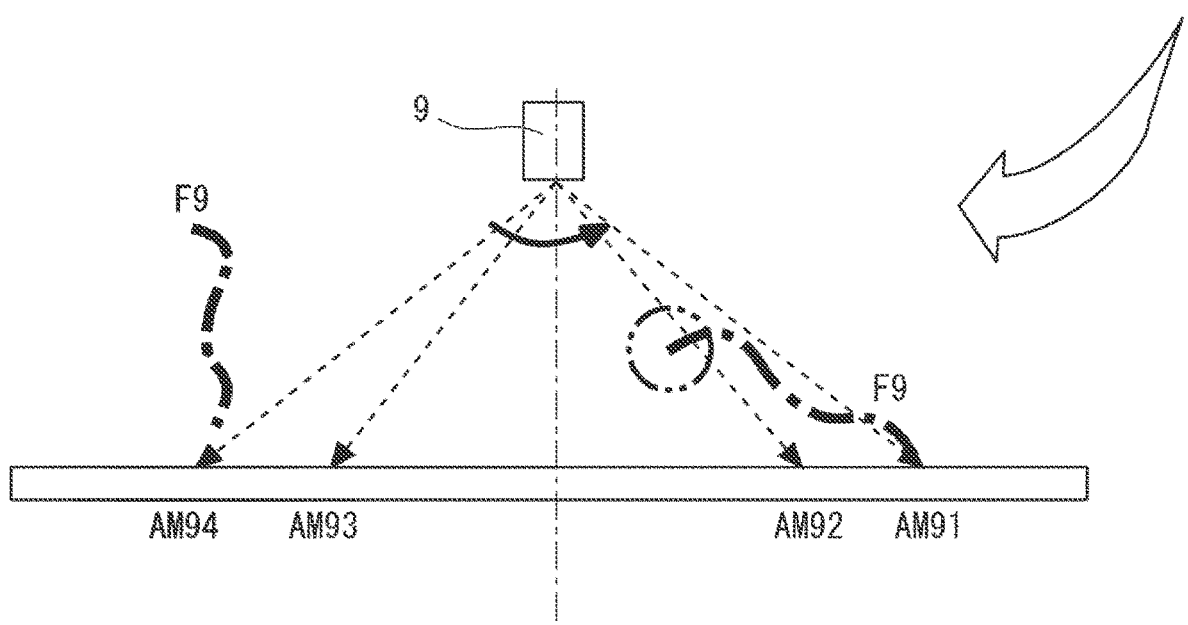
FIG. 15 is a schematic view illustrating another operation of the laminate molding apparatus according to the problem to be solved by the present disclosure.

Next will be described exemplary effects of the laminate molding method according to Embodiment 1 with reference to FIGS. 8, 9, and 13 to 15. FIG. 8 is a schematic view of an essential part of one modification of the laminate molding apparatus according to Embodiment 1. FIG. 9 is another schematic view of the essential part of the laminate molding apparatus illustrated in FIG. 8. FIG. 13 is a schematic view illustrating an essential part of a laminate molding apparatus according to the problem to be solved by the present disclosure. FIG. 14 is a schematic view illustrating another essential part of the laminate molding apparatus illustrated in FIG. 13. FIG. 15 is a schematic view illustrating an operation of the laminate molding apparatus according to the problem to be solved by the present disclosure.

Molding Accuracy

A laminate molding apparatus 101 illustrated in FIG. 8 is one modification of the laminate molding apparatus 100 illustrated in FIG. 2. The laminate molding apparatus 101 has the same configuration as the laminate molding apparatus 100 except that the laminate molding apparatus 101 includes a laser head 81 and a laser head 82. The laser head 81 and the laser head 82 have the same configuration as the laser head 8 illustrated in FIG. 2.

The laser head 81 is provided in a part between generally a center 5a of the table 5 and an outer edge 5b and above the table 5. The laser head 82 is provided in a part between generally the center 5a of the table 5 and an outer edge 5c and above the table 5. The laser heads 81, 82 are examples of the laser head 8 illustrated in FIG. 2. The laser heads 81, 82 emit laser beams L1 toward the metal powder layer P2. An angle at which the laser beam L1 intersects with the metal powder layer P2 is an incidence angle $\theta 1$ of the laser beam L1. During the emission of the laser beam L1, the incidence angle $\theta 1$ changes appropriately in accordance with the shape of a molded object to be molded. When the incidence angle $\theta 1$ is maximum, the laser beam L1 has a focal distance LD1 and an irradiation diameter D1b, D1c.

In the meantime, as illustrated in FIG. 13, there is a laminate molding apparatus 901 according to the problem to be solved by the present disclosure. A laser head 98 provided in the laminate molding apparatus 901 is placed above generally a center 95a of a table 95. The laser head 98 emits a laser beam L9 toward a metal powder layer P92. An angle at which the laser beam L9 intersects with the metal powder layer P92 is an incidence angle $\theta 91$ of the laser beam L9. When the incidence angle $\theta 91$ is maximum, the laser beam L9 has a focal distance LD9 and an irradiation diameter D91.

Here, the focal distance LD1 illustrated in FIG. 8 is shorter than the focal distance LD9 illustrated in FIG. 13. Further, the incidence angle $\theta 1$ illustrated in FIG. 8 is smaller than the incidence angle $\theta 91$ illustrated in FIG. 13. Hereby, the irradiation diameter D1 illustrated in FIG. 8 is smaller than the irradiation diameter D91 illustrated in FIG. 13. Accordingly, the dispersion of the energy density distribution in the irradiation diameter D1 is smaller than that in the irradiation diameter D91. On this account, changes in a melting progress degree in the irradiation diameter D1 depending on irradiated parts are small and uniform as compared with a melting progress degree in the irradiation diameter D91.

Further, when the laser heads 81, 82 are provided above the main surface of the table 5 and above the molded object AM1 on a straight line directed from the center 5a toward the outer edge 5b, an increase in the incidence angle θ1 of the laser beam L1 can be restrained, and therefore, this configuration is preferable. Hereby, the dispersion of the energy density distribution can be restrained, and the changes in the melting progress degree in the irradiation diameter D1 can be restrained.

Filling Rate

As illustrated in FIG. 9, the gas supply portion 6 is provided in generally the center 5a of the table 5. The gas discharge holes 4d are provided on the outer side of the table 5. The gas supply portion 6 is placed between the gas discharge holes 4d, more specifically, at a middle point between the gas discharge holes 4d. The gas supply portion 6 supplies gases GF1, GF2 through the gas emission port 6a, and the gases GF1, GF2 are discharged to outside the outer periphery cover 4 through the gas discharge holes 4d, respectively. A moving distance LG1 of the gas GF1 is the same as a distance from generally the center 5a of the table 5 to the outer edge Sb of the table 5. Similarly, a moving distance LG2 of the gas GF2 is the same as a distance from generally the center 5a of the table 5 to the outer edge 5c of the table 5.

In the meantime, FIG. 14 illustrates the laminate molding apparatus 901 according to the problem to be solved by the present disclosure. As illustrated in FIG. 14, an inlet 96 for the gas GF91 is provided in a first end 95b of the table 95. A gas discharge hole 94d is provided in a second end 95c of the table 95. The gas GF91 is supplied from the inlet 96 for the gas GF91, and the gas GF91 is discharged to outside the outer periphery cover 94 through the gas discharge hole 94d. A moving distance LG91 of the gas GF91 is the same as a distance from the first end 95b to the second end 95c of the table 95.

The distance from the first end 95b to the second end 95c of the table 95 is the same as the distance from the outer edge 5b to the outer edge 5c of the table 5 illustrated in FIG. 9. The moving distances LG1, LG2 of the gases GF1, GF2 are shorter than the moving distance LG91 of the gas GF91 and about a half of the moving distance LG91. On this account, the gases GF1, GF2 are passed through the gas discharge holes 4d so as to carry almost all fumes to outside the outer periphery cover 4, so that the fumes hardly remain inside the outer periphery cover 4. That is, the gases GF1, GF2 can remove the fumes appropriately. Further, it is not necessary to increase the wind power of the gases GF1, GF2, and therefore, such a situation hardly occurs that particles with small diameters are carried away on the metal powder layer P2 while only particles with large diameters remain. Accordingly, the molded object can maintain a minute structure.

One Concrete Example of Laminate Molding Method

Figure 10:
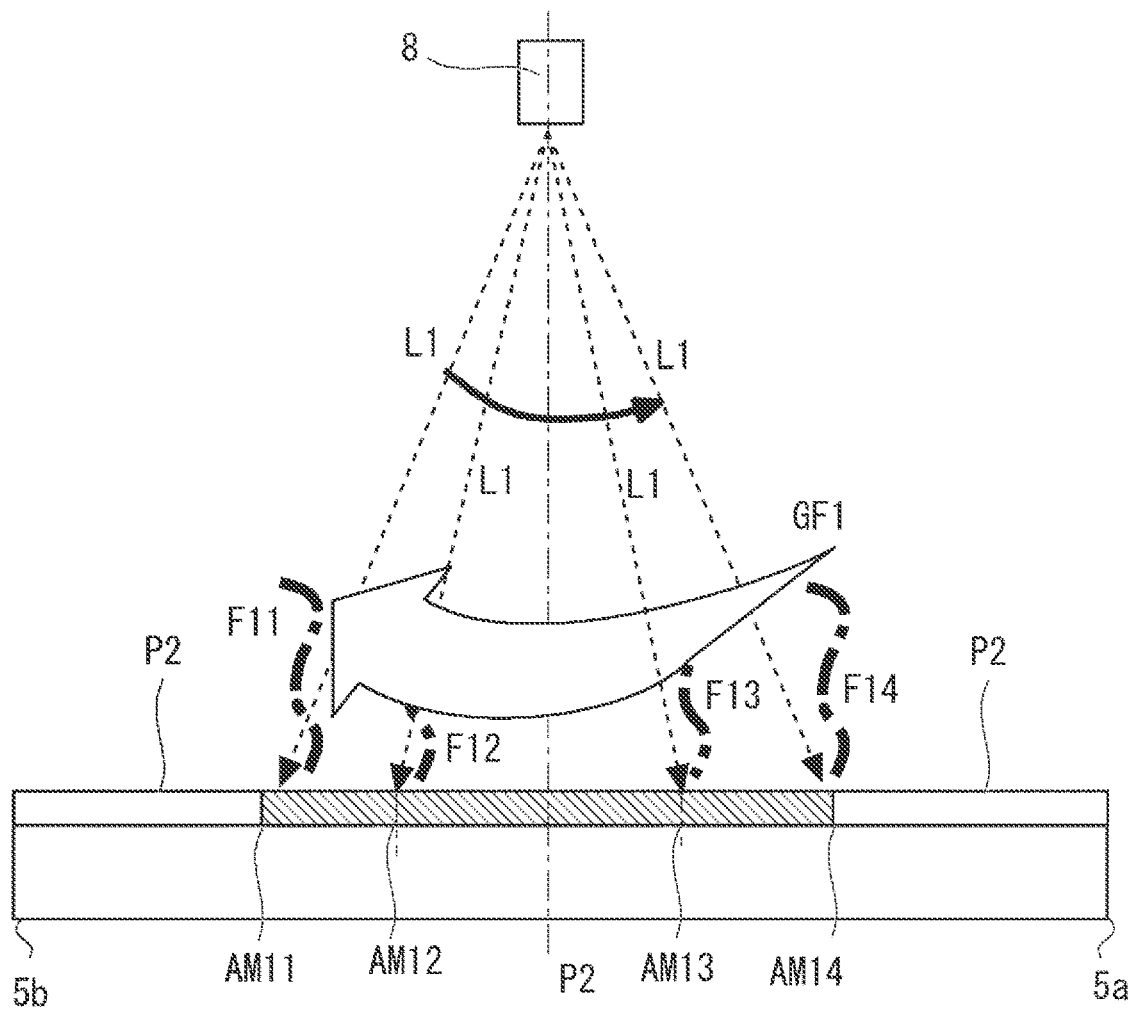
FIG. 10 is a side view illustrating another operation of one example of the laminate molding apparatus according to Embodiment 1.
Figure 12:
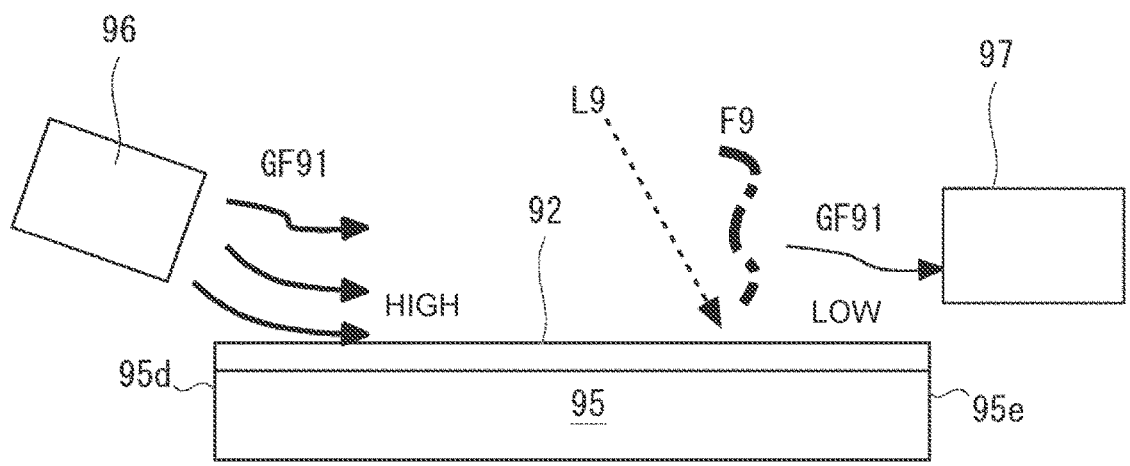
FIG. 12 is a schematic view illustrating a laminate molding apparatus according to the problem to be solved by the present disclosure.

Next will be described one concrete example of the laminate molding method according to Embodiment 1 with reference to FIGS. 1 to 6, 10, and 11. FIG. 10 is a side view illustrating another operation of one example of the laminate molding apparatus according to Embodiment 1. FIG. 11 is a top view illustrating another operation of the one example of the laminate molding apparatus illustrated in FIG. 1.

In metal powder layer forming step ST1, the metal powder P1 is supplied onto the table 5 by use of the squeegee 7, so that the metal powder layer P2 is formed. The metal powder layer P2 is placed in a first region on the main surface of the table 5 below the squeegee 7.

Subsequently, in table rotationally moving step ST2, the table 5 is rotated relative to the squeegee 7 and the laser head 8. More specifically, the metal powder layer P2 formed in metal powder layer forming step ST1 is moved from the first region on the main surface of the table 5 below the squeegee 7 to a second region on the main surface of the table 5 below the laser head 8.

Subsequently, in melting step ST3, the laser beam L1 emitted from the laser head 8 is applied to the metal powder layer P2, so that the metal powder layer P2 is melted. When the metal powder layer P2 solidifies after the metal powder layer P2 melts, at least part of the molded object AM1 is formed. Further, while the metal powder layer P2 is being melted, gas is emitted from the gas emission port 6a provided in generally the center of the table 5 toward the outer side of the table 5.

In melting step ST3, as illustrated in FIG. 10, the laser beam L1 is emitted from the laser head 8 to the metal powder layer P2 so that an irradiated part, of the metal powder layer P2, that is irradiated with the laser beam L1 moves from the outer edge 5b side of the table 5 toward the center 5a side of the table 5. More specifically, by changing the posture of the laser head 8, the irradiated part, of the metal powder layer P2, that is irradiated with the laser beam L1 is moved from the outer side of the table 5 toward the center side of the table 5. The irradiated part thus irradiated with the laser beam L1 corresponds to respective parts AM11, AM12, AM13, AM14 of the molded object AM1 and moves in this order. A fume F11 is generated in the part AM11 of the molded object. Similarly, a fume F12 is generated in the part AM12 of the molded object, a fume F13 is generated in the part AM13 of the molded object, and a fume F14 is generated in the part AM14 of the molded object. The fumes F11, F12, F13, F14 are generated in this order.

After that, the posture of the laser head 8 is changed to its original posture while the emission of the laser beam L1 is stopped. Hereby, the laser head 8 takes a posture in which the laser head 8 can emit the laser beam to the outer side of the table 5 again, or the laser head 8 moves to a position where the laser head 8 can emit the laser beam to the outer side of the table 5.

The emission of the laser beam L1, the stop of the emission of the laser beam L1, and the change of the posture of the laser head 8 are repeated. For example, as illustrated in FIG. 11, the laser beam L1 emitted from the laser head 8 is applied to the metal powder layer P2 so that the irradiated part, of the metal powder layer P2, that is irradiated with the laser beam L1 moves along a locus R1. After that, while the emission of the laser beam L1 is being stopped, the posture of the laser head 8 is changed so that the intersection between an emission axis of the laser beam L1 and the metal powder layer P2 moves along a locus R2.

Subsequently, in table vertically moving step ST4, the table 5 is moved vertically relative to the squeegee 7 and the laser head 8. More specifically, the squeegee 7 and the laser head 8 are moved upward to be separated from the table 5. The distance by which the squeegee 7 and the laser head 8 are moved upward should be the same as the thickness of the metal powder layer P2 or the molded object AM1. Further, the squeegee 7 and the laser head 8 should be moved upward so that the distance between the laser head 8 and the metal powder layer P2 is kept uniform appropriately.

Subsequently, it is determined whether the molded object AM1 is finished up or not (finish determination step ST5). When it is determined that the molded object AM1 is not finished up (finish determination step ST5: NO), the process returns to metal powder layer forming step ST1. That is, the process from metal powder layer forming step ST1 to table vertically moving step ST4 is repeated until it is determined that the molded object AM1 is finished up.

Metal powder layer forming step ST1 to table vertically moving step ST4 can be started generally at the same timing and ended generally at the same timing.

Hereby, the molded object AM1 can be manufactured.

In such a laminate molding method, gas is emitted toward the outer side of the table 5 from the center side of the table 5 while the molded object AM1 is being formed. The moving distance of the gas can be shortened, so that the gas can flow vigorously. On this account, the gas discharges fumes to outside the table 5, so that the fumes can be removed appropriately. This accordingly makes it possible to restrain the fumes from adversely affecting the quality of the molded object AM1.

Further, in one concrete example of the laminate molding method according to Embodiment 1, in melting step ST3, the laser beam L1 emitted from the laser head 8 may be applied to the metal powder layer P2 so that the irradiated part, of the metal powder layer P2, that is irradiated with the laser beam L1 moves from the outer side of the table 5 toward the center side of the table 5. Hereby, the irradiated part is moved from the outer side of the table 5 toward the center side of the table 5. Fumes flow outwardly from the center side of the table 5 by the gas, so that the irradiated part moves in a direction distanced from the fumes. On this account, the fumes do not block irradiation with electromagnetic energy. This accordingly makes it possible to further restrain the fumes from affecting the quality of the molded object AM1.

Note that the present disclosure is not limited to the above embodiments, and various modifications can be made within a range that does not deviate from the gist of the present disclosure. Further, the present disclosure may be performed by employing the above embodiments and their examples in combination. Note that, in the one concrete example of the laminate molding method according to Embodiment 1, in table rotationally moving step ST2, the table 5 is rotated relative to the squeegee 7 and the laser head 8. However, the squeegee 7 and the laser head 8 may be rotated relative to the table 5. Further, in the one concrete example of the laminate molding method according to Embodiment 1, in metal powder layer forming step ST1, the metal powder P1 is supplied onto the table 5 by use of the squeegee 7. However, the metal powder P1 may be supplied onto the table 5 by use of a net (not shown). More specifically, the laminate molding apparatus 100 includes a net instead of the squeegee 7. The net has mesh through which the metal powder P1 can flow. The net is connected via a pipe (not shown) or the like and receives the metal powder P1 from the tank 9. The metal powder P1 can be supplied to the table 5 through the net from the tank 9 such that the metal powder P1 falls by gravity, for example.

What is claimed is:

1. A laminate molding method for additionally manufacturing a molded object on a table by use of metal powder, the laminate molding method comprising:
   a metal powder layer forming step of forming a metal powder layer by supplying the metal powder onto the table;
   a melting step of melting the metal powder layer by applying, to the metal powder layer, electromagnetic energy emitted from an electromagnetic energy source;
   a rotating step of rotating the electromagnetic energy source and the table relative to each other; and
   a table vertically moving step of vertically moving the table relative to the electromagnetic energy source, wherein gas is emitted from a gas emission port in a lateral direction toward an outer side of the table, the gas emission port being provided to a center of the table,
   wherein, in the melting step, the electromagnetic energy emitted from the electromagnetic energy source is applied to the metal powder layer so that an irradiated part of the metal powder layer moves from the outer side of the table toward a center side of the table, the irradiated part being irradiated with the electromagnetic energy.

2. The laminate molding method according to claim 1, wherein the metal powder layer forming step and the melting step are performed at the same time.

3. The laminate molding method according to claim 1, wherein the metal powder layer forming step and the table vertically moving step are performed at the same time.

4. The laminate molding method according to claim 1, wherein the metal powder layer forming step, the melting step, and the table vertically moving step are performed at the same time.

5. The laminate molding method according to claim 1, wherein
   the table is provided inside an outer periphery cover, the outer periphery cover including a gas discharge hole on an inner peripheral surface above the table,
   the discharge hole faces the gas emission port in the lateral direction, and
   the gas is emitted from the gas emission port in the lateral direction toward the discharge hole.

* * * * *